May 5, 1942.　　　A. E. WESTBURGH　　　2,282,275
LUBRICATOR
Filed Jan. 25, 1941
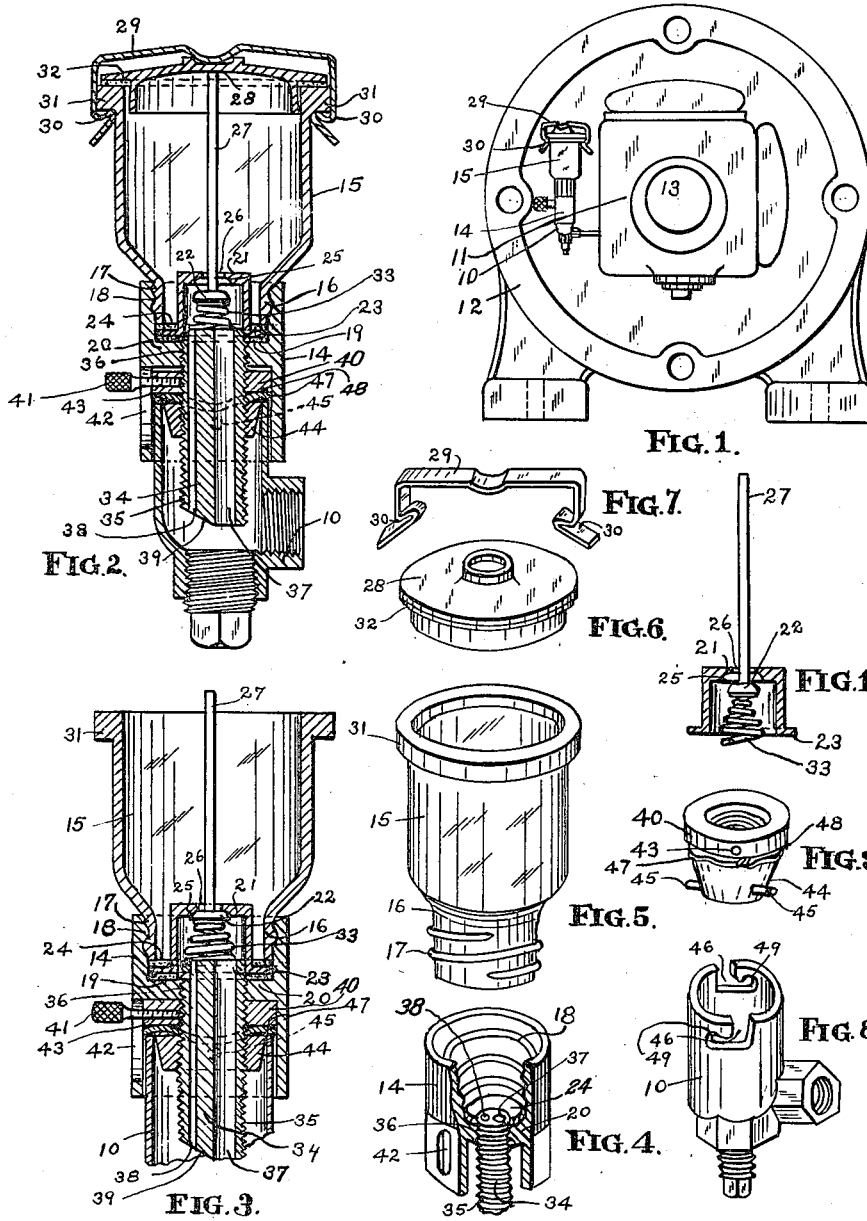
Inventor,
ARTHUR E. WESTBURGH,
By [signature]
His Attorney.

Patented May 5, 1942

2,282,275

UNITED STATES PATENT OFFICE 2,282,275

LUBRICATOR

Arthur E. Westburgh, Jamestown, N. Y.

Application January 25, 1941, Serial No. 376,004

8 Claims. (Cl. 184—82)

This invention relates to a lubricator and aims generally to provide an improved, more dependable, simplified and durable construction of the type in which oil is supplied automatically and without gurgling and maintained at a predetermined level about the lubricator part or parts.

A prime object is to produce a construction having novel means adjustable to vary and control the oil level according to the demands and requirements of and at the parts lubricated.

Another aim is to provide such a structure wherein the reservoir and other oil-supplying parts are, as a unit, separably connected in a novel manner to the oil cup, preferably with a snap action.

A further object is to provide a simplified valve construction for the feed or supply conduit, which is maintained in open position by the closure member of the reservoir and which will automatically close the lubricator when detached from the oil cup.

Various additional objects and advantages will become apparent from a consideration of the description following taken in connection with the accompanying drawing illustrating an operative embodiment.

In the drawing:

Figure 1 is an elevation of a motor equipped with a lubricator constructed in accordance with the invention;

Figure 2 is a longitudinal sectional view through the lubricator and cup to which it is attached;

Figure 3 is an enlarged fragmentary longitudinal section through the lubricator with the closure removed and the valve in closed position;

Figure 4 is a perspective view, partly broken away, illustrating the mounting sleeve and a portion of the supply conduit.

Figure 5 is a perspective view of the reservoir;

Figure 6 is a perspective view of the reservoir closure;

Figure 7 is a perspective view of the fastening bail for said reservoir closure;

Figure 8 is a perspective view of the oil cup;

Figure 9 is a perspective view of the oil level adjusting nut and fluted ring carried thereby; and, Figure 10 is a view of the valve structure, primarily in central longitudinal section.

Referring specifically to the drawing wherein like reference characters designate like or corresponding parts, 10 represents an oil cup adapted for attachment to any desired part requiring lubrication, which may, for example, be a bearing housing 11 of an electric motor 12, to lubricate the bearing and shaft 13 of the motor, as shown in Figure 1.

Separably connected to the oil cup 10 is a mounting sleeve 14 which carries an oil reservoir 15, which is preferably transparent and of glass, although it may be constructed of any other suitable material. Reservoir 15 has a lower reduced neck 16 provided with external screw threads 17 which detachably engage corresponding screw threads 18 interiorly of the mounting sleeve 14. A gasket 19 of fiber or the like is seated on an internal flange 20 of the sleeve 14 midway of the ends of the latter.

Within the neck 16, an inverted cup shaped housing 21 is provided for the valve 22. Said housing has an outwardly extending flange 23 at its base which extends under the wall of neck 16 and between which wall and flange, a fiber or other gasket 24 is interposed so that the connection of sleeve 14 and reservoir 15 is oil tight. Said gasket 19 is preferably fastened to the flange 20 against detachment as by the use of shellac and gasket 24 is preferably secured by shellac to the sleeve 14 and to the flange 23.

Said housing 21 has a valve seat at 25 about a central opening 26 in its top wall, which seat is engageable by the valve 22. Valve 22 has a depressor rod 27 rising through the opening 26 and engaged at the top by a removable closure or cover 28 on the reservoir 15. A detachable spring bail 29 secures the cover 28 in place, terminally having hooks 30 engaging beneath an annular flange 31 at the top of the reservoir. A gasket 32 is interposed between flange 31 and said cover 28. The reservoir contains oil and when the closure is in place, rod 27 is depressed and the valve 16 opens so that the oil will pass from the reservoir through the opening 26. An expansive coil spring 33 is located within the housing 21 and urges valve 22 towards its seat, so as to seat the same and close the opening 26 when cover 28 is removed.

Said spring 33 is seated on the top of an oil supply conduit member 34 which is externally screw threaded at 35 to engage screw threads 36 about a central opening through flange 20, said screw threads being fitted relatively tight. A longitudinal passage 37 is provided through the conduit 34 for the flow of oil from the reservoir to the cup 10 and an air passage 38 is also provided longitudinally through the conduit member communicating with the interior of the reservoir and the interior of the cup 10, the conduit member being chamfered across the passage 38 at 39 at the lower end so that a predetermined oil level will be maintained in the cup 10 and bearing housing 11, and upon recession of such oil level, oil will be automatically supplied from the reservoir to the cup to maintain such level.

The height of the oil level within the cup 10 and bearing housing 11 may be varied or controlled according to the height of the conduit member 34 with respect to the cup 10.

The structure is adjustable or regulable to this end and accordingly a nut 40 is in screw threaded engagement with the threads 35. Such nut may be located at any desired location along the conduit 34 and it is fastened against displacement in such locations by a screw 41 which passes through a vertically elongated slot 42 in sleeve 14 and then into a screw threaded opening 43 disposed radially of and adjacent the top of the nut. Said nut has a lower tapered portion 44 whereby it allows sufficient air space within cup 10. Diametrically disposed outwardly extending lugs 45 are provided on the tapered portion 44 which are detachably engageable by L-shaped or bayonet slots 46 at the upper end of the oil cup 10. Surrounding the nut 40 is a split resilient ring 47, which is maintained in place between a shoulder 48 on the nut and the aforesaid lugs 45. It will be noted that in the upper walls at bayonet slots 46, at the terminals, notches 49 are provided. As a result of the construction described, the lubricator is applicable to the oil cup by inserting lugs 45 into the bayonet slots 46 and then turning the lubricator so that the lugs pass into the terminals and finally seat in the notches 49. This adjustment is effected with a snap action since the flutes or corrugations of ring 47 are so proportioned that the reservoir must first be depressed to slightly flatten and tension the ring 47 before lugs 45 are low enough to enter the lateral branches of the bayonet slots and, of course, after such branches have been entered, the tension of ring 47 causes the lugs 45 to enter or snap into the notches 49, effectively minimizing danger of accidental detachment. It will be realized that this snap action occurs regardless of the position at which the nut 43 is secured along the conduit member 34 and, hence, regardless of the predetermined oil level for which the parts are adjusted or set.

Various changes may be resorted to provided they fall within the spirit and scope of the invention.

I claim:

1. A lubricator having a sleeve attachable to an oil cup, an inwardly extending annular flange on said sleeve, a reservoir attached to said sleeve, an oil supply conduit depending from said flange having passage means to establish communication between the reservoir and the oil cup, valve means to control passage of oil from the reservoir through the conduit, a removable housing for said valve means seated on said flange and contacted by the reservoir to maintain the housing in place, a closure for the reservoir normally maintaining said valve means in open position, and means urging the valve means toward closed position.

2. A lubricator having a sleeve attachable to an oil cup, an inwardly extending annular flange on said sleeve spaced from one end of the latter, a reservoir extending into said end of the sleeve and attached to said sleeve above the flange, an oil supply conduit depending from said flange having passage means to establish communication between the reservoir and the oil cup, a removable housing within the reservoir communicating with the passage means having an opening therethrough, said reservoir contacting said housing to maintain the same in place, a valve means for said opening, a closure for the reservoir normally maintaining said valve means in open position, and means urging the valve means toward closed position.

3. A lubricator having a sleeve attachable to an oil cup, an inwardly extending annular flange on said sleeve spaced from one end of the latter, a reservoir attached to said sleeve above the flange, an oil supply conduit depending from said flange having passage means to establish communication between the reservoir and the oil cup, a housing within the reservoir communicating with the passage means and having an opening therethrough, a flange at the base of said housing seated on the first mentioned flange and overlapped and clamped in place by the reservoir, a valve for said opening, said valve being located within the housing, a rod rising from the valve, an expansive spring supported within the housing and urging closing of said valve, and a closure for the reservoir engaging said rod and normally maintaining said valve in open position.

4. A lubricator having a sleeve attachable to an oil cup, an inwardly extending annular flange on said sleeve, a reservoir attached to said sleeve above the flange, an oil supply conduit depending from said flange having passage means to establish communication between the reservoir and the oil cup, a housing within the reservoir communicating with the passage means and having an opening therethrough, a flange at the base of said housing clamped in place by the reservoir, a valve for said opening, said valve being located within the housing, a rod rising from the valve, an expansive spring supported within the housing and urging closing of said valve, a closure for the reservoir engaging said rod and normally maintaining said valve in open position, said conduit having external screw threads, the first mentioned flange having a central opening and screw threads engaged by a portion of the last mentioned screw threads, a nut adjustable to different positions along said conduit on the remainder of the screw threads relative to the outlet end of the conduit to enable predetermination of the oil level in the cup, and means on the nut to attach the lubricator to an oil cup.

5. A lubricator having a sleeve attachable to an oil cup, an inwardly extending annular flange on said sleeve, a reservoir attached to said sleeve above the flange, an oil supply conduit depending from said flange having passage means to establish communication between the reservoir and the oil cup, a housing within the reservoir communicating with the passage means and having an opening therethrough, a flange at the base of said housing clamped in place by the reservoir, a valve for said opening, said valve being located within the housing, a rod rising from the valve, an expansive spring supported within the housing and urging closing of said valve, a closure for the reservoir engaging said rod and normally maintaining said valve in open position, said conduit having external screw threads, the first mentioned flange having a central opening and screw threads engaged by a portion of the last mentioned screw threads, a nut adjustable to different positions along said conduit on the remainder of the screw threads relative to the outlet end of the conduit to enable predetermination of the oil level in the cup, means projecting from the nut for attachment of the lubricator to an oil cup, said nut having a shoulder, a resilient element positioned on the nut between the shoulder and projecting means for tensioning through attachment of the nut to an oil cup to minimize danger of detachment.

6. A lubricator having a reservoir, a part carrying said reservoir having a recess in its lower end, a conduit depending from said part through said recess having passage means communicating with the reservoir and adapted for communication with an oil cup, an element within said recess having means for attachment to an oil cup, said element having a laterally disposed surface to rest on the upper edge of the oil cup, said element being mounted on and adjustable to different distances with respect to the outlet end of said conduit to control the oil level within the oil cup.

7. A lubricator having a reservoir, a part carrying said reservoir, a conduit depending from said part having passage means communicating with the reservoir and adapted for communication with an oil cup, an element adapted for attachment to an oil cup, said element being mounted on and adjustable to different distances with respect to the outlet end of said conduit to control the oil level within the oil cup, said element having a shoulder, outwardly projecting means on the element for attachment to an oil cup, a compressible ring surrounding the element between the shoulder and projecting means for tensioning through attachment of the element to an oil cup to minimize danger of detachment, said part having an elongated slot, and a detachable fastening on said part passing through said slot.

8. A lubricator having a part attachable to an oil cup, said part having a recess in its lower end, a reservoir carried by said part, a conduit leading from said part through said recess having passage means communicating with the reservoir and adapted for communication with the oil cup, an element within said recess having means for attachment to the oil cup and having a laterally disposed surface to rest on the upper edge of the oil cup, said element being disposed on and adjustable to different distances with respect to the outlet end of said conduit to control the oil level within the oil cup, and means extending through said part operable to secure the part and element against relative movement in the adjusted positions thereof.

ARTHUR E. WESTBURGH.